April 2, 1929.  A. A. HANSEN  1,707,265
MEANS FOR TESTING LEVER KEYS
Filed Dec. 20, 1926
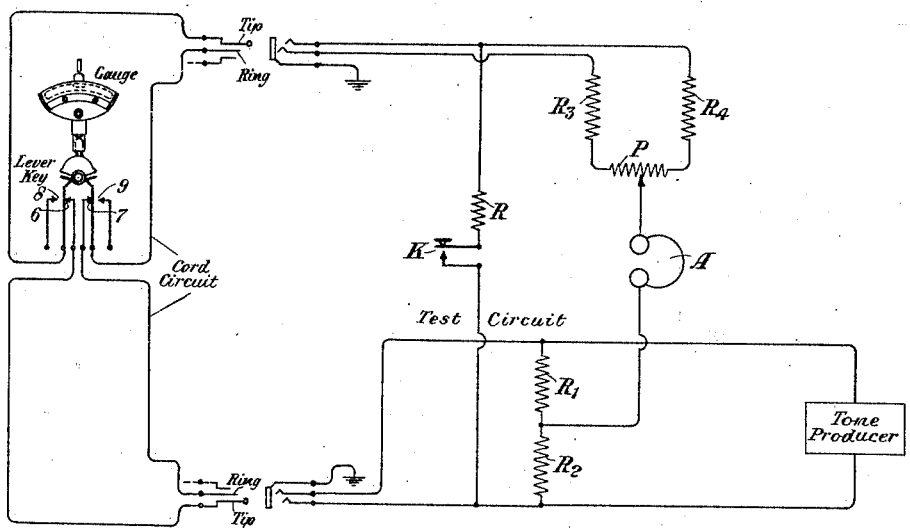
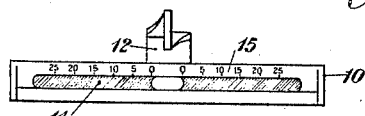
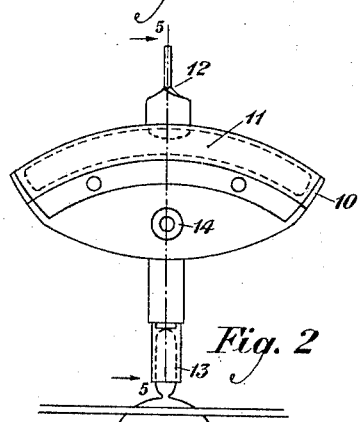
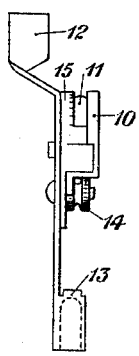
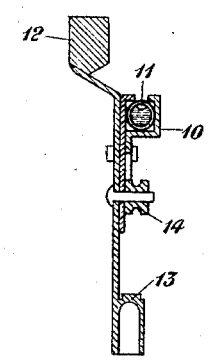
INVENTOR.
A. A. Hansen
BY
ATTORNEY Patented Apr. 2, 1929.

1,707,265

UNITED STATES PATENT OFFICE.

ARNOLD A. HANSEN, OF WEST ORANGE, NEW JERSEY, ASSIGNOR TO AMERICAN TELEPHONE AND TELEGRAPH COMPANY, A CORPORATION OF NEW YORK.

MEANS FOR TESTING LEVER KEYS.

Application filed December 20, 1926. Serial No. 156,017.

This invention relates to means for testing the adjustment of keys used in electric circuits, and more particularly keys of the lever type.

It is the object of the invention to provide means for testing such keys whereby an accurate observation may be taken of the relative adjustment of the springs and contacts and also of the degree of idle travel or "play" of the key lever.

In accomplishing my purpose I employ a novel form of spirit level gauge and a balanced tone test circuit, as will be more fully described hereinafter.

The invention will be clearly understood when the following detailed description is read with reference to the accompanying drawing.

Figure 1 of the drawing shows in diagrammatic form an arrangement of a cord circuit, the key, the gauge, and the test circuit, which is suitable for the practice of my invention; Fig. 2 is a side elevation of the key and the associated gauge; Fig. 3 shows a top view, and Fig. 4 an end elevation of the gauge; and Fig. 5 is a sectional view of the gauge taken on the line 5—5 of Fig. 2.

With reference first to Fig. 1, the cord circuit is shown at the left, with the lever key and with the gauge attached to the key knob. In the normal position of the key, as shown, the contacts 6 and 7 are closed, completing circuits between the tips and the rings of the cord circuit plugs, respectively, and the contacts 8 and 9 are open. At the right there is shown a balanced tone test circuit with the usual tone producer, receiver A, potentiometer P, and resistances $R_1$, $R_2$, $R_3$ and $R_4$. This circuit terminates in jacks through which connection may be made with the plugs of the cord circuit. A key K, normally open, is included in the test circuit. When this key is closed and the plugs of the cord circuit are inserted in the jacks of the test circuit, the tips are connected together through a resistance R.

The gauge, in its preferred form, consists of a metal holder 10 which contains a curved spirit level 11. A handle 12 is associated with the holder, and a member 13 is designed to fit tightly over the knob of the key lever. The metal holder is connected to the attaching member by means of the lock nut 14. On the holder member 10 is a scale 15, graduated in degrees to correspond with the curvature of the spirit level.

This gauge may be used on lever keys mounted in any position. If the mounting is on a horizontal panel, the device is used in the position shown in Fig. 2. If the panel is a vertical one, the lock nut 14 is loosened, and the member 10 with the spirit level 11 is rotated through an angle of 90° with respect to the fitting member 13. By adjusting the position of the member 10, relative to the member 13, the device may be used on keys mounted at intermediate angles.

With the lever travel gauge attached to the key knob, and the cord circuit connected to the test circuit by the insertion of the plugs into the jacks, the key lever is slowly operated. The point at which the key contacts make or break the circuit will be indicated by the tone testing set, as more fully disclosed below, and the angular deflection of the key lever at the points at which the circuit changes occur may be read on the gauge.

The accurate observation of the spring and contact adjustment is obtained as follows: The potentiometer P is set sufficiently off center so that a moderate volume of tone will be heard in the receiver A. When the key lever is moved slowly in one direction, the first change in the circuit shown in Fig. 1 is the break of either the tip connection or the ring connection of the cord circuit at the key. When one of these breaks occurs, the tone circuit will be entirely unbalanced and the tone will be materially increased in the receiver. At this point the key K may be closed and an indication received that the tip circuit or the ring circuit is opened. If upon the operation of the key K there is no change in the tone volume, the indication is that the ring circuit is open and the tip circuit closed. If, however, there is a change in the tone volume upon the operation of the key K, the indication is that the tip circuit is open and the ring circuit closed, the key operation having connected the two sides of the tip circuit together through the resistance R. If the key lever is moved farther in the same direction and the key K is returned to its normal open position, at the point at which both the tip and ring contacts become open no further tone will be heard in the receiver.

While the invention has been disclosed in one specific embodiment which is deemed desirable, it is to be understood that its scope is not limited thereby but is determined by the appended claims.

What is claimed is:

1. The combination of a cord circuit and a testing circuit having a plurality of resistance elements therein and connecting means whereby said resistance elements and sides of said cord circuit may be arranged to compose the branches of a Wheatsone bridge, a tone source and a receiver connected across opposite points of said bridge, a shunt path connected around one of the sides of said cord circuit, a resistance and a key in said shunt path, a lever key for controlling said cord circuit, and means attachable to the lever of the cord circuit key for indicating the angular travel of said lever from its normal position.

2. The combination of a cord circuit and a testing circuit having a plurality of resistance elements therein and connecting means whereby said resistance elements and the sides of said cord circuit may be arranged to compose the branches of a Wheatstone bridge, a tone source and a receiver connected across opposite points of said bridge, a resistance associated with said testing circuit, means for selectively connecting said resistance between the tip conductors of said circuits, a lever key for controlling said cord circuit, and means attachable to the lever of the cord circuit key for indicating the angular travel of said lever from its normal position.

3. The combination of a cord circuit and a testing circuit having a plurality of resistance elements therein and connecting means whereby said resistance elements and sides of said cord circuit may be arranged to compose the branches of a Wheatstone bridge, a tone source and a receiver connecting opposite sides of said bridge, a shunt path around one of the sides of said cord circuit, a resistance and a key in said shunt path, a lever key for controlling said cord circuit, and means attachable to the lever of the cord circuit key for indicating the angular travel of said lever from its normal position, said means comprising a curve spirit level and a device for fixing the level at any angle to the axis of the lever.

4. A combination of a cord circuit and a testing circuit having a plurality of resistance elements therein, and connecting means whereby said resistance elements and sides of said cord circuit may be arranged to compose the branches of a Wheatstone bridge, a tone source and a receiver connected across the opposite point of said bridge, a resistance associated with said testing circuit, means for selectively connecting said resistance between the tip conductor of said circuits, a lever key for controlling said cord circuit, and means attachable to the lever of the cord circuit key for indicating the angular travel of said lever from its normal position, said means comprising a curve spirit level and a device for fixing the level at any angle to the axis of the lever.

In testimony whereof, I have signed my name to this specification this 17th day of December, 1926.

ARNOLD A. HANSEN.